(12) United States Patent
Hoefken et al.

(10) Patent No.: US 9,555,349 B2
(45) Date of Patent: Jan. 31, 2017

(54) ROTARY DISC FILTER DEVICE

(71) Applicant: Advanced Filtration Technologies Inc., Tallahassee, FL (US)

(72) Inventors: Marcus Hoefken, Erlangen (DE); Thomas Hagspiel, Postbauer-Heng (DE)

(73) Assignee: ADVANCED FILTRATION TECHNOLOGIES INC., Tallahassee, FL (US)

( * ) Notice: Subject to any disclaimer, the term of this patent is extended or adjusted under 35 U.S.C. 154(b) by 314 days.

(21) Appl. No.: 14/251,330

(22) Filed: Apr. 11, 2014

(65) Prior Publication Data

US 2015/0290565 A1    Oct. 15, 2015

(51) Int. Cl.
*B01D 33/15* (2006.01)
*B01D 33/23* (2006.01)
*B01D 33/21* (2006.01)

(52) U.S. Cl.
CPC ............... *B01D 33/15* (2013.01); *B01D 33/23* (2013.01)

(58) Field of Classification Search
CPC ....... B01D 33/15; B01D 33/23; B01D 33/067; B01D 33/50; B01D 33/763; B01D 33/21
USPC ....... 210/331, 346, 224–231, 461, 495, 486, 210/497.3, 498
See application file for complete search history.

(56) References Cited

U.S. PATENT DOCUMENTS

| | | | |
|---|---|---|---|
| 1,446,448 A * | 2/1923 | Brown | B01D 33/0048 210/216 |
| 4,699,716 A | 10/1987 | Barra | |
| 8,252,181 B2 * | 8/2012 | Pitre | B01D 33/19 210/330 |
| 8,961,785 B2 | 2/2015 | Danielsson et al. | |
| 2011/0056883 A1 | 3/2011 | Kerl et al. | |

FOREIGN PATENT DOCUMENTS

NL     6800631 A     7/1969
WO  2004/076026 A1   9/2004

OTHER PUBLICATIONS

PCT/ISA/210, "International Search Report for International Application No. PCT/EP2015/057022," Aug. 10, 2015.

* cited by examiner

*Primary Examiner* — Madeline Gonzalez
(74) *Attorney, Agent, or Firm* — Manabu Kanesaka

(57) ABSTRACT

A rotary disc filter device includes a rotor rotatable about an axis of rotation. The rotor includes a plurality of disc-shaped filter members, each disc-shaped filter member having a frame. The frame is made of sheet metal elements which are connected with each other by rivets.

16 Claims, 10 Drawing Sheets

ROTARY DISC FILTER DEVICE

FIELD OF THE INVENTION

The present invention relates to a rotary disc filter device comprising a rotor rotatable about an axis of rotation, the rotor comprising a plurality of disc-shaped filter members, each disc-shaped filter member having two walls extending outwardly from the axis of rotation.

BACKGROUND ART

Filtering devices, for instance rotary disc filter devices, are used especially for filtering off particles from liquids.

A common rotary disc filter is disclosed, for instance, in SE-C-224 131 and the principle thereof is illustrated in FIG. 1. The rotary disc filter 1 comprises a rotor having a horizontal, slowly rotating drum 11, which supports a number of parallel, disc-shaped filter members 12 which are successively arranged in spaced-apart relationship along the center axis of the drum 11 and which extend radially away from the drum (just partly shown in FIG. 1). The disc-shaped filter members 12 have, on their parallel orientated opposite lateral surfaces, openings which are covered with a filter cloth 13. Each rotary disc filter member 12 has a central opening through which a liquid A which is to be filtered can flow to the interior of the disc-shaped filter member 12. The liquid A is conducted through an inlet into the drum 11 and falls then down through openings in the drum into the interior of the disc-shaped filter elements 12, from which liquid A continues to flow out through the filter cloth 13 so that the particles which are to be filtered off adhere at the inside of the filter cloth 13.

U.S. Pat. No. 7,972,508 B2 discloses a rotary disc filter including a plurality of disc-shaped filter members secured about a drum. Each disc-shaped filter member has parallel orientated opposite lateral surfaces. The disc-shaped filter member is made of a plurality of modular frame members secured on the drum. The modular frame members may be made of plastic.

PCT/SE2007/000606 discloses a filter element for covering an opening in a disc-shaped filter member. The filter element is made of a filter cloth frame manufactured in one piece of cast light metal and a filter cloth which is glued to the filter cloth frame. The filter cloth frame may be made of a die-cast aluminum alloy.

The construction of the rotor of the rotary disc filter devices according to the prior art is complicated or requires the expensive manufacture of specific parts, like modules. Furthermore, the rotors according to the prior art are relatively heavy in weight. In order to support such a rotor it is necessary to provide a supporting structure having a high stability. Such supporting structure is expensive to manufacture. Furthermore, the rotor disc filter devices according to the prior art have a voluminous design.

It is desirable to reduce the cost of manufacture of a rotary disc filter device. Furthermore, it is desirable to reduce the volume of a rotary disc filter device.

SUMMARY OF THE INVENTION

An object of the present invention is to solve the above problems by providing an improved rotary disc filter device.

A specific object is to provide a rotary disc filter device which requires less effort and cost to manufacture and which has a compact design.

According to the invention, these objects are achieved by a rotary disc filter device comprising the features in the first aspect of the invention, with preferred embodiments in other aspects.

In the inventive rotary disc filter device, a frame is made of sheet metal elements which are connected to each other by rivets or screws. The sheet metal elements can be produced at low cost e.g. by laser cutting and, if required, by subsequent forming, e.g. press-forming or folding. The manufacture of a rotor from sheet metal elements does not require the provision of an injection die-molding device and the expensive manufacture of an injection mold. Besides that a rotor made of the proposed sheet metal elements is relatively low in weight. Surprisingly, it turns out that a simple connection by rivets results in a frame of excellent mechanical stability. It is not necessary to connect the sheet metal elements by welding.

In the present invention, the term "rivet" has to be understood in a general manner. The term "rivet" comprises all kinds of suitable rivets, like semi/round head rivets, high-strength structural steel rivets, semi-tubular rivets, blind rivets, Oscar rivets, drive rivets, flush rivets, friction-lock rivets. Preferably, the rivets are fixed by a rivet gun. Also the term "screw" has to be understood in a general manner. A screw can be a machine screw, a sheet metal screw or the like. The screw may have any kind of suitable head. In case of using machine screws, the sheet metal elements may be provided with a corresponding thread. The thread may be embodied as a press in threaded insert. Connections made by use of a machine screw may be secured by a thread sealing or a thread locker made of a polymer.

Preferably, the sheet metal elements are made of stainless steel. In this case, also the rivets or screws are made of stainless steel. In such cases, it is not necessary to provide an anti-corrosive protection. A disc-shaped filter member made of stainless steel sheet metal elements is durable and can be maintained at low cost.

According to an embodiment in the rotary disc filter device, the frame defines two walls extending outwardly from the axis of rotation, wherein at least one of the walls of the disc-shaped filter member has the form of a frustum. In this manner, it is no longer necessary to mount adjacent disc-shaped filter members with their inner circumference in an axially spaced apart relationship on a drum. As a result, the rotary disc filter device can be designed in a more compact manner. Furthermore, it is no longer necessary to provide a relatively heavy drum on which the disc-shaped filter members are to be mounted. When forming at least one of the walls of each disc-shaped filter member in the form of a frustum, it is possible to directly connect adjacent disc-shaped filter members to form the rotor. This simplifies the manufacture of the rotor. The rotor has less weight. As a result, a supporting structure for supporting the rotor can be manufactured at less expense.

The frustum may a cone or a pyramid. Preferably, the pyramid has n sides, n being a value from 6 to 12, preferably 8 to 10. Advantageously the walls or the disc-shaped filter member, respectively, have the form of a bifrustum, in particular the form of a bipyramid. A disc-shaped filter member having the form of a bifrustum symmetrical with respect to a plane extending perpendicular to the axis of rotation can be manufactured by using a small number of identical sheet metal elements. Costs for manufacture of the rotary disc filter device can be saved thereby.

According to a preferred embodiment, the walls lie against each other an outer circumference of the disc-shaped filter member, i.e. according to this embodiment a circumferential edge of the walls has not to be connected by a separate circumferential wall extending parallel to the axis of rotation. The abutting walls form an acute angle at the other circumference of the disc-shaped filter element. This again simplifies the construction of the rotary disc filter device.

A first sheet metal element may be a ring-shaped mounting plate forming an inner circumference of the wall, the ring-shaped mounting plate having a central section extending in a radial direction or perpendicular direction, respectively, with respect to the axis of rotation. The ring-shaped mounting plate may have advantageously a circular inner breakthrough and a polygonal outer circumference. The proposed ring-shaped mounting plate is preferably used to connect adjacent disc-shaped filter members with each other. The adjacent disc-shaped filter members can be aligned in a proper manner by aligning the inner circular breakthroughs of the ring-shaped mounting plates and then by connecting the adjacent ring-shaped mounting plates at their central sections, e.g. by the use of screws or bows with each other.

A second sheet metal elements may form a spike mounted at the mounting plate to extend in an outward direction. A third sheet metal element may form an outer circumferential frame element connecting outer ends of the spikes. The outer circumferential frame elements may be connected with each other to form an outer polygonal circumference of the frame. The disc-shaped filter member can therefore be simply and be manufactured at low cost by first, second and third sheet metal elements which preferably have an identical shape.

At least one of the ring-shaped mounting plates of the disc-shaped filter member is advantageously connected with a further ring-shaped mounting plate of an adjacent disc-shaped filter member. It is also possible that both ring-shaped mounting plates are connected nearby with a further ring-shaped mounting plate of an adjacent disc-shaped filter member. According to this embodiment, the disc-shaped filter members are arranged in a stack-like manner, each disc-shaped filter member being directly connected with an adjacent disc-shaped filter member. In the proposed arrangement, the provision of a drum on which the disc-shaped filter members are mounted, is not necessary.

In a further embodiment, resulting from the arrangement in a stack-like manner, in a radial sectional view, a clearance between adjacent walls of two disc-shaped filter members increases with a radial distance from the axis of rotation. An opening angle β between two adjacent walls may be in the range of 10° to 40°, preferably in the range of 15° to 35°. In the radial sectional view, the clearance is preferably symmetrical with respect to the plane extending perpendicular to the axis of rotation.

At least one of the mounting plates arranged at an axial end of the rotor is preferably connected with a pipe section arranged coaxially with respect to the axis of rotation. Such pipe section serves to rotatably support the rotor in a support structure.

From the ring-shaped mounting plate, there extends, advantageously at an angle α of 160° to 185°, a plurality of spikes, the radial outer ends thereof being connected with an outer circumferential frame member.

According to the embodiment of the invention, an opening in the frame limited by two spikes, the ring-shaped mounting plate and the outer circumferential frame member is covered by a filter element. The filter element may comprise a filter frame having a further inner circumference corresponding to the opening, the filter frame holding a filter cloth. The filter frame may be made of further sheet metal elements. The filter frame is preferably made of two further sheet metal elements. The further sheet metal elements are preferably connected by welding. They may also be connected by rivets or screws. It is also possible to produce the filter frame by a plastic material, e.g. by injection molding.

DETAILED DESCRIPTION OF THE EMBODIMENTS

Figure 1:
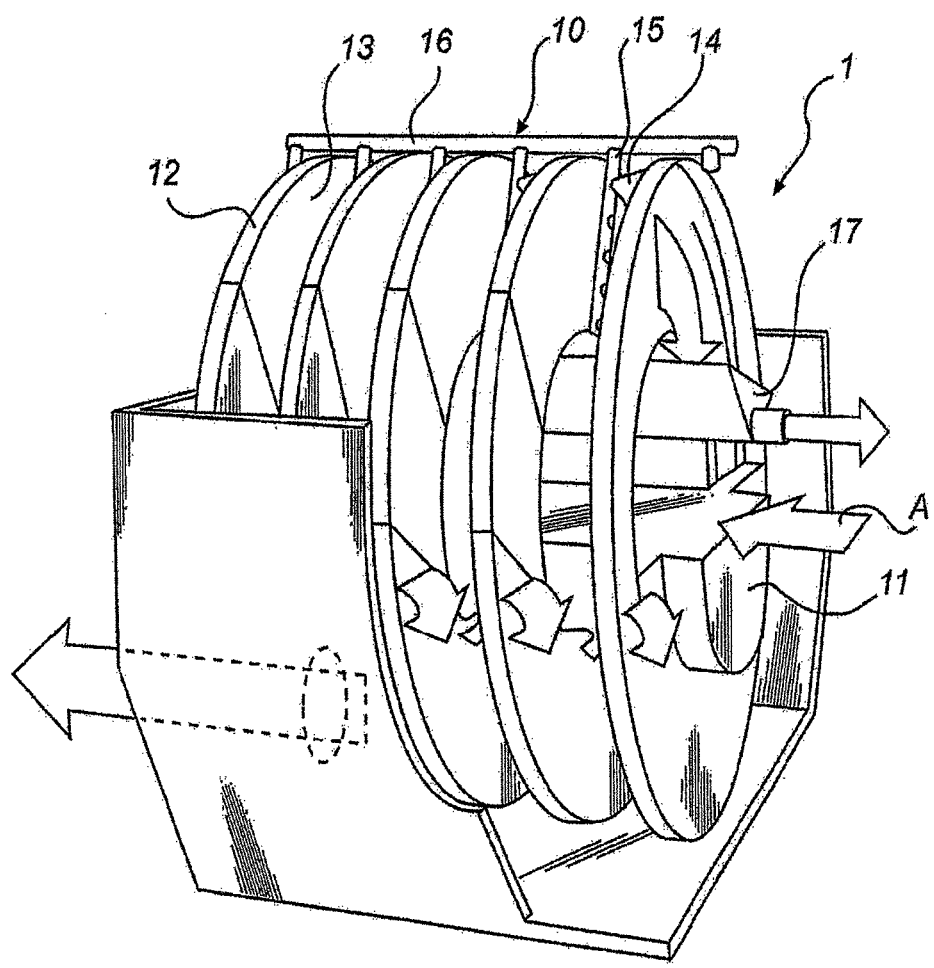
FIG. 1 is a perspective view which schematically illustrates the principal of a rotary disc filter device according to the prior art.

The invention will in the following be described in more detail with reference to the accompanying drawings which by way of example illustrate preferred embodiments of the invention.

A rotary disc filter device according to the present invention comprises a supporting structure 20 which rotatably supports a rotor 21 which is rotatable about an axis Ax of rotation.

The support structure 20 comprises a housing 22 having an inflow port 23 arranged at one end side of the housing 22 in the vicinity of the axis Ax. The inflow port 23 is connected to an inflow pipe 23a extending through a central portion of the housing 22. The inflow pipe 23b, which is fixed at its both ends at the housing 22, has openings 23b arranged opposite to an interior of a disc-shaped filter member 30. The interior of the disc-shaped filter member is formed by a space limited by opposing walls thereof. An outflow port 24 is arranged at the opposing end side of the housing 22 nearby a bottom 25 of the housing 22. From a cover 26 of the housing 22, there extend flush tubes 27 (not shown in detail here). Through a centre of the housing 22, there extends a discharge duct 28 which leads to a further outflow port 29 arranged nearby the axis Ax at the one end side of the housing 22.

Figure 3:
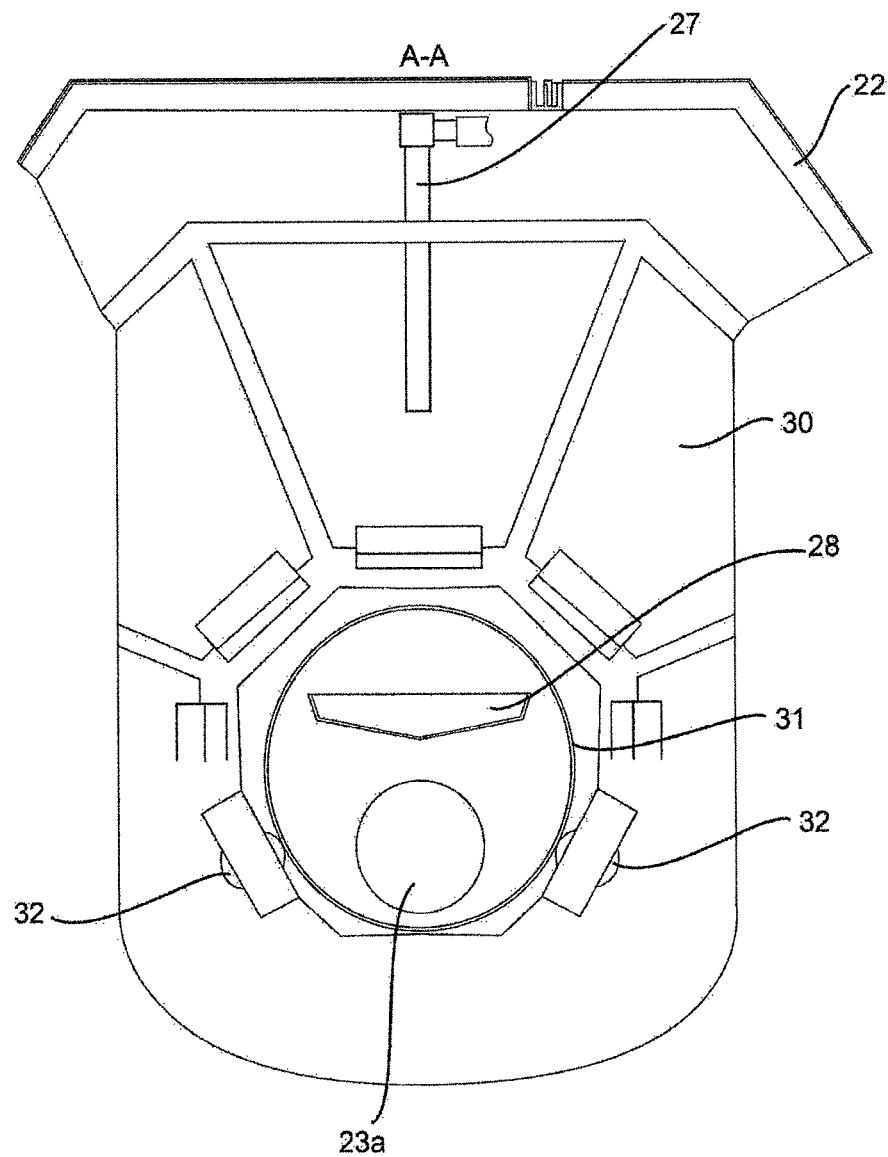
FIG. 3 is a sectional view according to section line A-A in FIG. 2.
Figure 4:
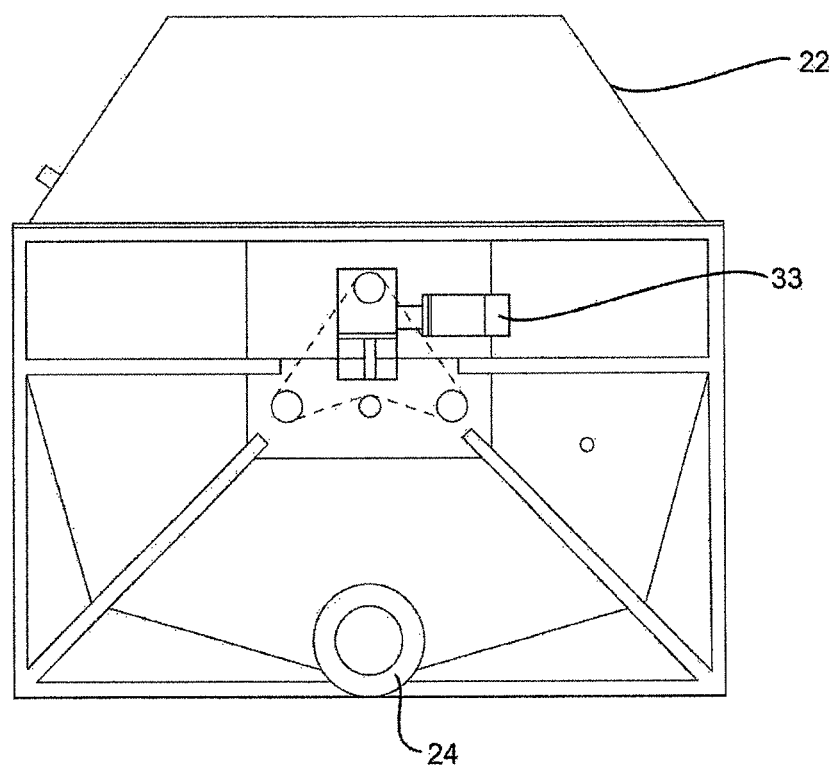
FIG. 4 is an end view of the rotary disc filter device in accordance with FIG. 2.

The rotor 21 comprises a plurality of the disc-shaped filter members 30 which surrounds the discharge duct 28 as well as the inflow pipe 23a. Each disc-shaped filter member 30 arranged at an axial end of the rotor 21 comprises a pipe section 31 extending in an axial direction thereof. As can be seen from FIG. 3 pipe sections 31 are supported on driving wheels 32 provided at the support structure 20. From FIG. 4, it can be seen that outside the housing 22, there is provided a driving unit 33 for driving the driving wheels 32 (not shown here).

Figure 6:
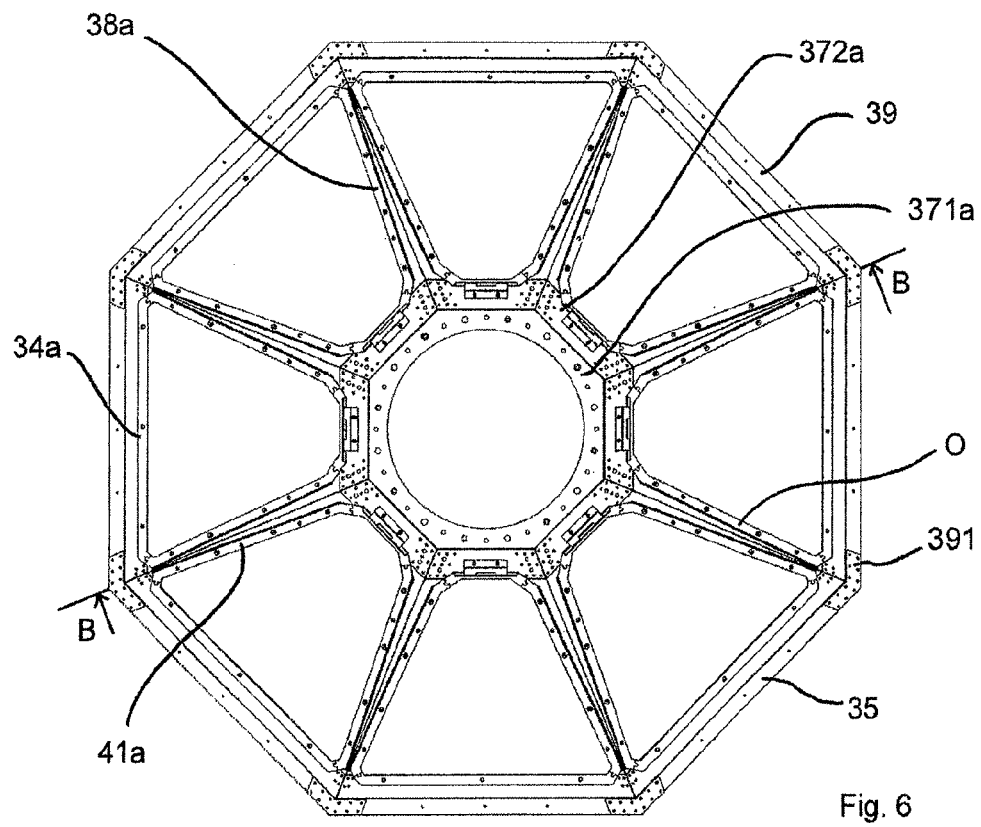
FIG. 6 is a top plane view according to FIG. 5.
Figure 5:
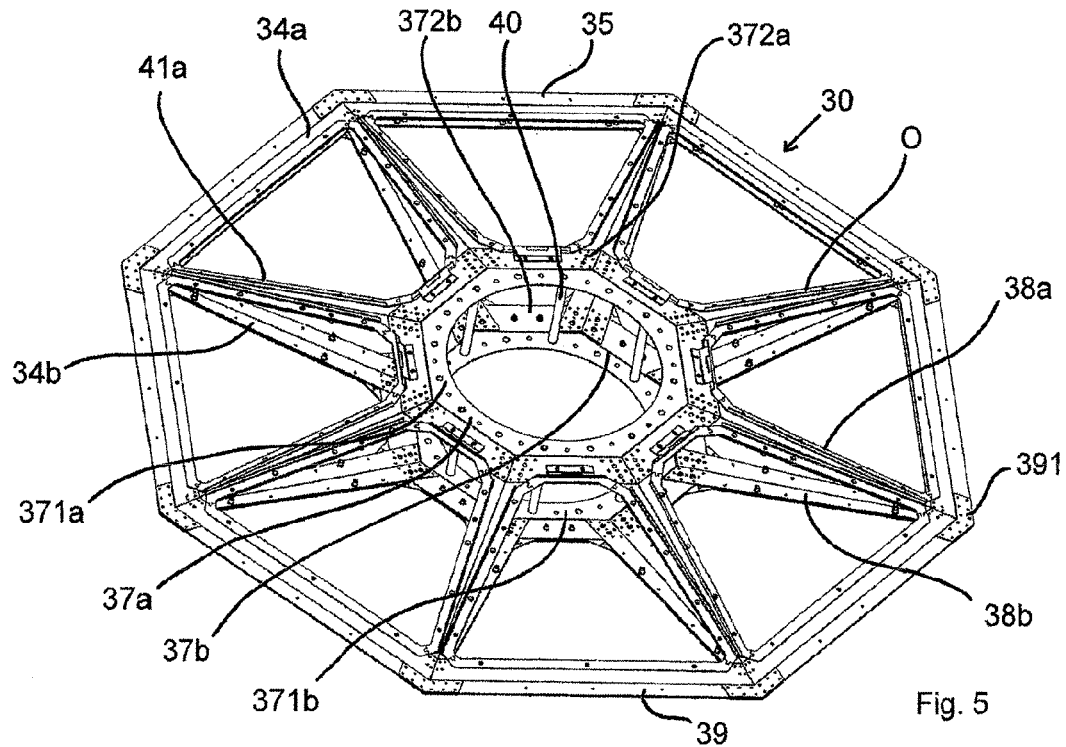
FIG. 5 is a perspective view of a disc-shaped filter member.
Figure 7:
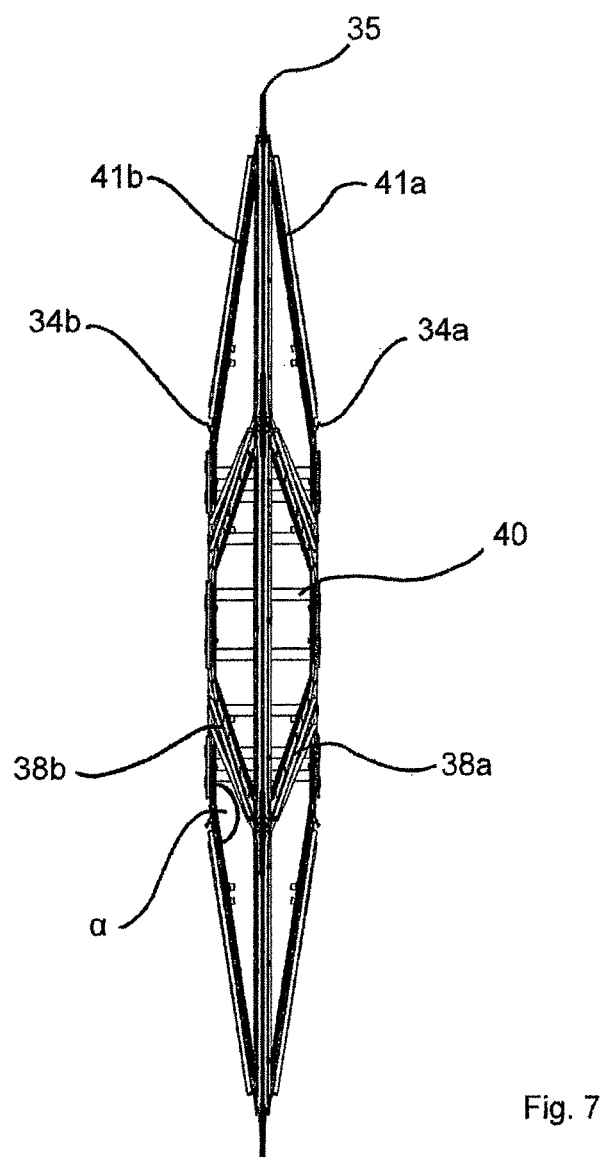
FIG. 7 is a sectional view according to section line B-B in FIG. 6.

With reference to FIGS. 5 to 7, there will now be described in detail an embodiment of a disc-shaped filter member 30. The disc-shaped filter member 30 is formed of two opposing walls 34a and 34b, each of which has the form of a pyramidal frustum. Walls 34a and 34b abut against an outer circumference 35 (see FIG. 7). The disc-shaped filter member 30 has therefore the form of a pyramidal bifrustum. The pyramidal bifrustum may have 6 to 12 opposing pyramidal faces. In the shown embodiment, the pyramidal bifrustum has 8 opposing pyramidal faces.

The disc-shaped filter member 30 comprises a frame which defines both opposing walls. The disc-shaped filter member is advantageously made of a limited number of sheet metal elements which differ in shape.

A first sheet metal element has the form of a ring-shaped mounting plate 37a, 37b. A central section 371a, 371b of the ring-shaped mounting plate 37a, 37b which forms a central breakthrough 36a, 36b of each wall, has a plane arranged perpendicular to the axis of rotation Ax in the mounted state. From the central section 371a, 371b, there extend an outer spike connecting section 372a, 372b at a first angle α of 160° to 185°.

Between the opposing central sections 371a, 371b, there may be provided axially running stiffeners 40. The stiffeners 40 may be made of cylindrical rods which may be fixed by screws. The stiffeners 40 may be arranged in an equal circumferential distance between the opposing central sections 371a, 371b. There may be arranged e.g. 6 to 12 of the stiffeners 40 running parallel to each other and to the axis of rotation Ax.

The ring-shaped mounting plates 37a, 37b have a polygonal outer circumference corresponding to the outer circumference 35 of the disc-shaped filter element 30. From each of the ring-shaped mounting plates 37a, 37b, especially the outer spike connecting sections 372a, 372b, there extend spikes 38a, 38b in an outer direction. Spikes 38a, 38b are made of sheet metal; they form second sheet metal elements. Spikes 38a, 38b form with the ring-shaped mounting plate 37a, 37b a first angle α of 160° to 185°. The end portions of two opposing spikes 38a, 38b are connected with each other. Further, the end portions of spikes 38a, 38b arranged adjacent to each other in a circumferential direction are connected by a third sheet metal element in the form of an elongated circumferential frame member 39. For connecting the circumferential frame members 39, there are advantageously provided connecting plates 391. The provision of the connecting plates 391 which advantageously form a fourth sheet metal element, makes it possible to manufacture the circumferential frame member 39 with a simple geometry and at less effort.

The first, second and third sheet metal elements are connected by rivets to form a frame having the shape of a bifrustum. Walls 34a, 34b are defined by the frame.

Each wall 34a, 34b comprises a plurality of openings O. Each opening O is defined by two spikes 38, the circumferential frame member 39, as well as by an outer spike connecting section 372a, 372b of the ring-shaped mounting plate 37a, 37b.

Figure 7A:
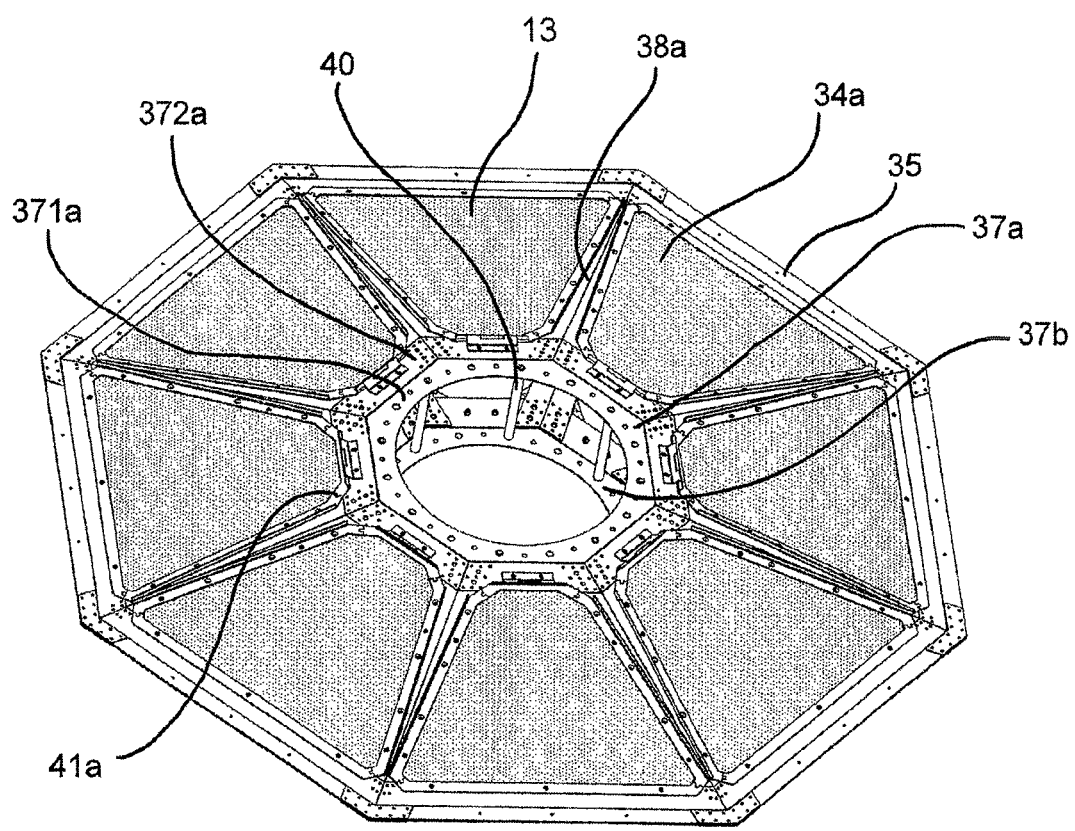
FIG. 7a is a perspective view of a disc-shaped filter member in accordance with FIG. 5 having filter cloths.

Reference numerals 41a and 41b, respectively, designate a filter frame holding a filter cloth 13 (see FIG. 7a). The filter cloth 13 may be made of stainless steel having a mesh in the range of 5 to 50 µm, in particular in the range of 10 to 30 µm. The filter frame 41a, 41b forms together with the filter cloth 13 a filter element, which covers the opening O.

In a preferable embodiment, the ring-shaped mounting plate 37a, 37b, the spikes 38a, 38b and the circumferential frame members 39 are made of sheet metal elements, which are preferably folded to enhance the stability thereof. The sheet metal elements are preferably made from stainless steel. They may have a thickness in the range of 1 mm to 10 mm. The sheet metal elements are preferably connected to each other by rivets. A disc-shaped filter member 30 shown in FIGS. 5 to 7 can be made by a small number of identical sheet metal elements which can be produced simply and at low expense. By the proposed manufacture of the disc-shaped filter element 30 of sheet metal elements, the weight of the rotor 21 can be reduced remarkably.

Figure 8:
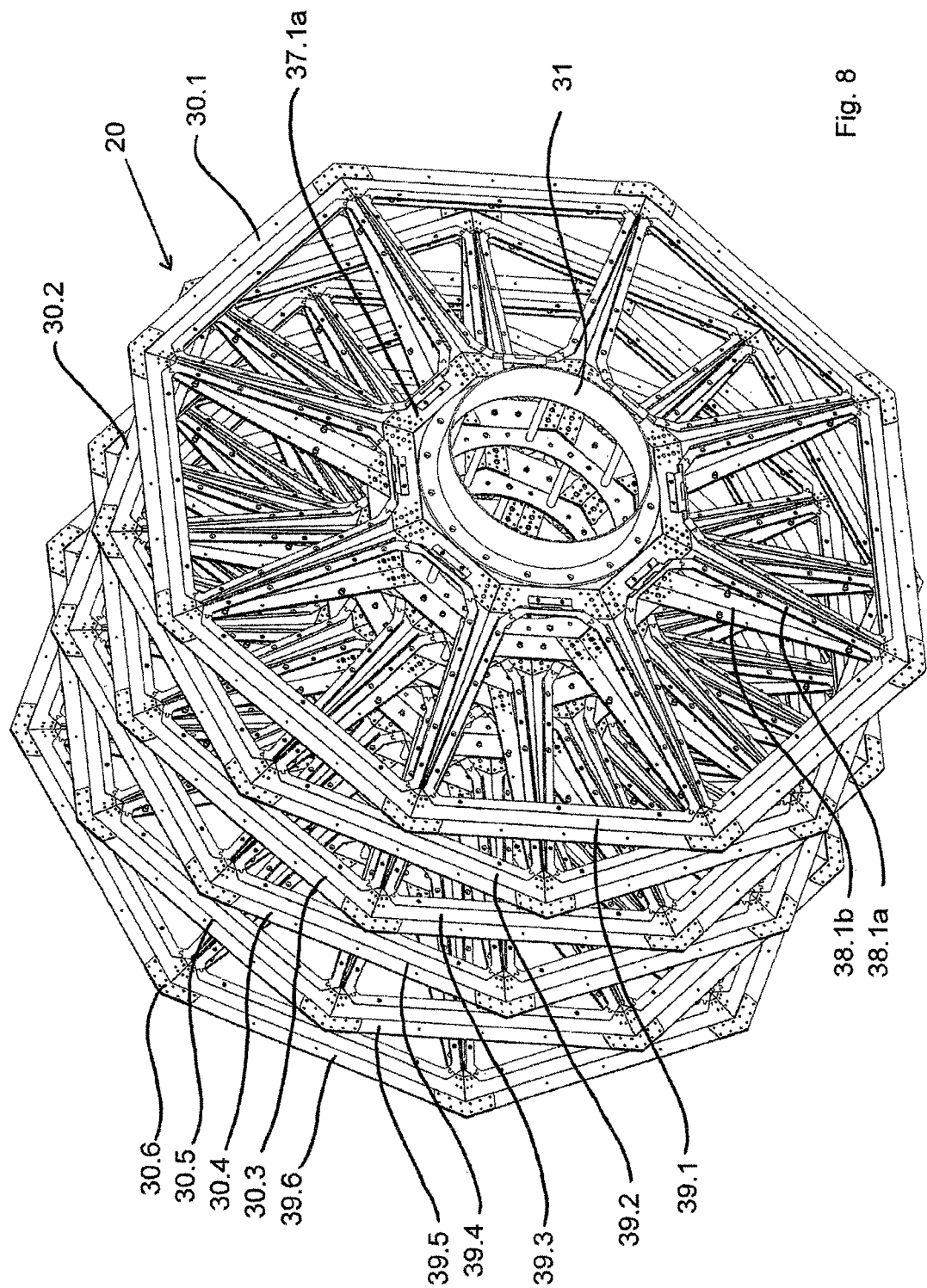
FIG. 8 is a perspective view of a rotor.
Figure 9:
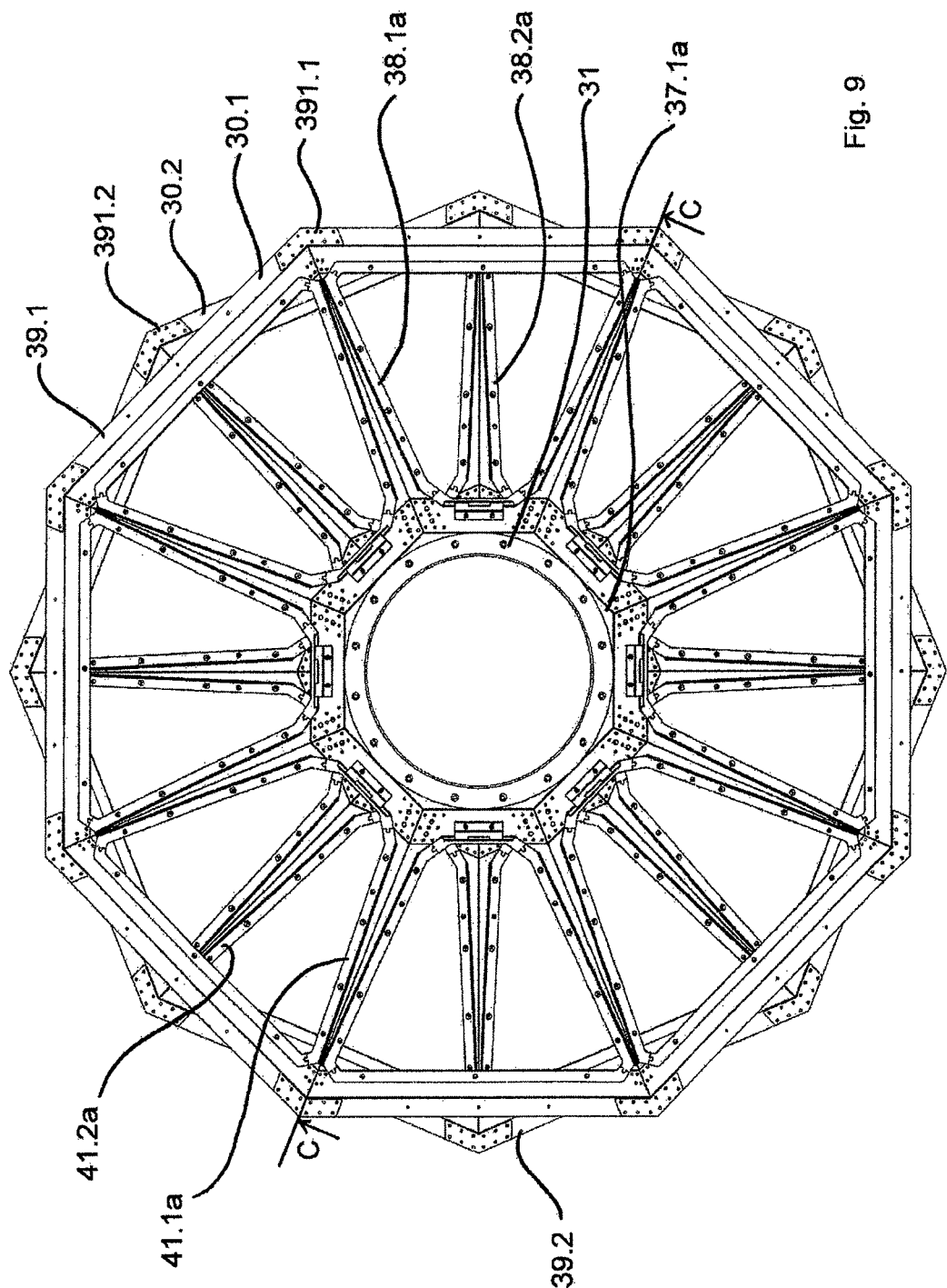
FIG. 9 is a top plane view according to FIG. 8.
Figure 10:
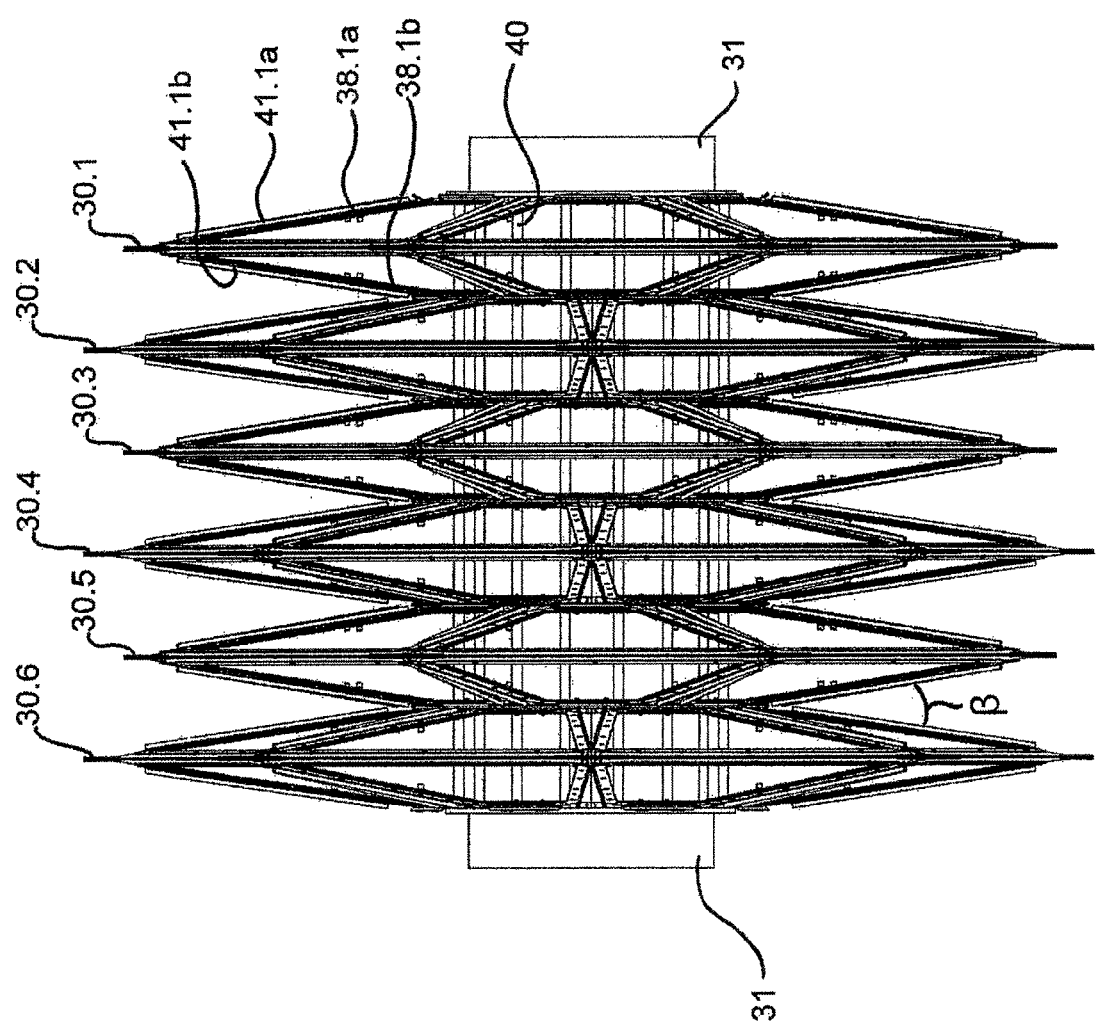
FIG. 10 is a sectional view according to section line C-C in FIG. 9.

FIGS. 8 to 10 show a preferable embodiment of a rotor 21 according to the present invention. The rotor 21 comprises a plurality of disc-shaped filter members 30.1 to 30.6 as shown in FIGS. 5 to 7. The disc-shaped filter members 30.1 to 30.6 are connected with each other at the central sections 371a, 371b of their ring-shaped mounting plates 37a, 37b, e.g. by the use of screws and e.g. nuts. As can be seen from FIGS. 8 to 10, two adjacent disc-shaped filter members 30.1 to 30.6 are mounted to each other in such manner that the spikes 38.1a, 38.2b thereof are offset from each other. The spikes 38a, 38b of a first disc-shaped filter member 30.1 and third disc-shaped filter member 30.3 are in alignment with each other. The central breakthrough 36a, 36b of all disc-shaped filter members 30.1 to 30.6 are in alignment with each other forming a central channel circumventing the inlet pipe 23a as well as the discharge duct 28. The proposed offset arrangement of the polygonal disc-shaped filter members 30.1 to 30.6 results in a smooth rotational movement of the rotor.

The function of rotary disc filter device according to the present invention is as follows:

Water to be cleaned is supplied via inflow port 23 to inflow pipe 23a. The water is discharged through openings 23b provided opposite the interior of each of the disc-shaped filter members 30.1 to 30.6. The water passes the filter cloth 13 held by filter frames 41a, 41b, 41.1a, 41.1b, 41.2a. Particles contained in the water adhere to an inner side of the filter cloth 13. When the rotor 21 rotates, the filter cloth 13 passes flush tubes 27 by which the particles adhering to the inner side of the filter cloth 13 are released and washed into the discharge duct 28. The particles are removed from the device via the further discharge port 29. The filtered water is discharged from the housing 22 via the discharge port 24.

Figure 2:
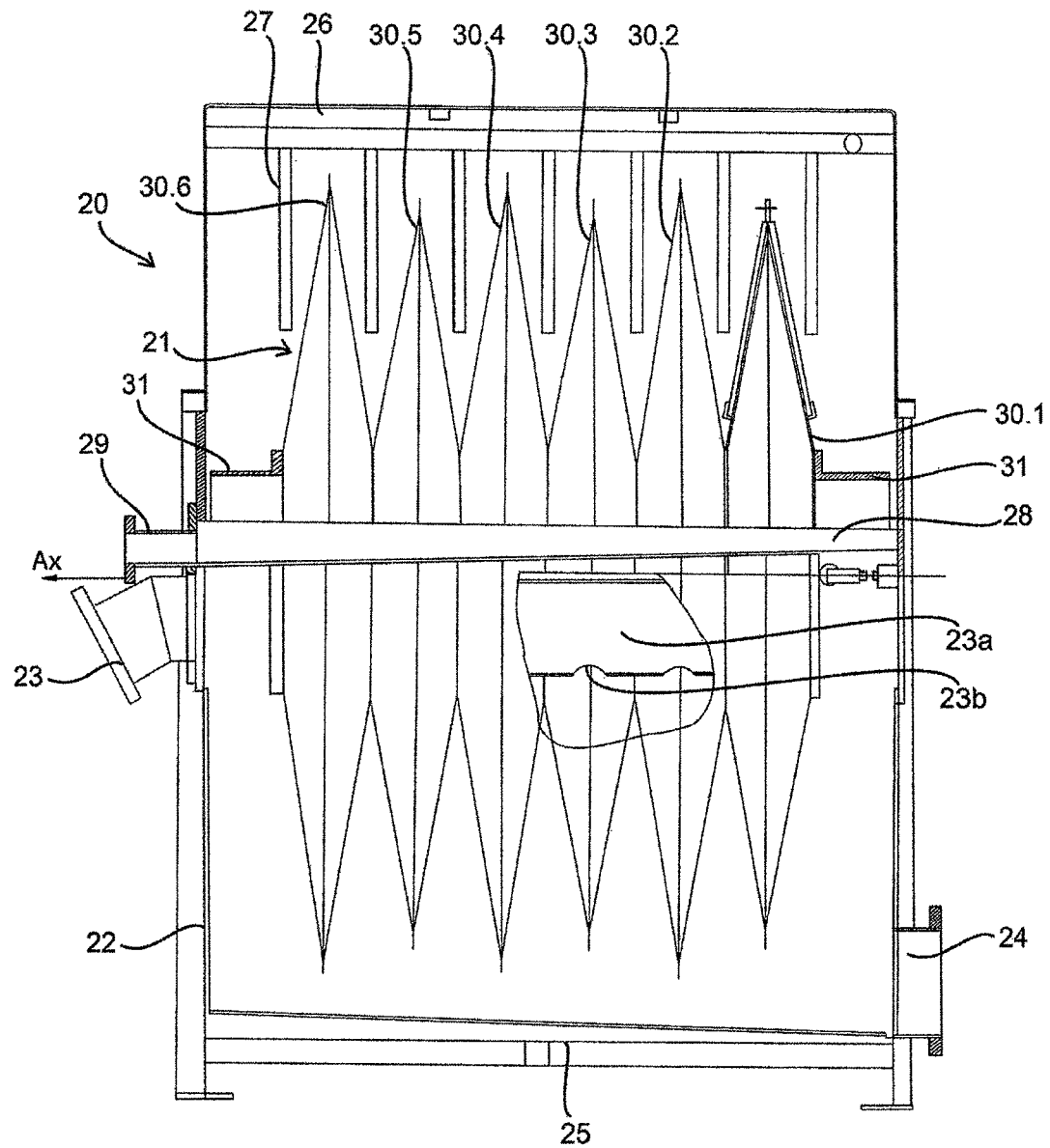
FIG. 2 is a partly broken up side view of a rotary disc filter device in accordance with the invention.

As can in particular be seen from FIGS. 2 and 10, the disc-shaped filter members 30.1 to 30.6 have opposing walls 34a, 34b. In a radial sectional view, a clearance between the opposing walls of two adjacent disc-shaped filter members increases with a radial distance from the axis of rotation A. A second angle β between two adjacent walls may be in the range of 10° to 40°, preferably in the range of 15° to 35°.

The proposed design of the rotor 21 is compact. This allows an overall compact design of the rotary disc filter device.

LIST OF REFERENCE SIGNS

1 Rotary disc filter
11 rotor
12 disc-shaped filter member
13 filter cloth
14 spray nozzle
15 flush tube
16 liquid-conducting tube
17 discharge duct
20 support structure
21 rotor
22 housing 23 inlet port
23a inflow pipe
23b opening
24 discharge port
25 bottom
26 cover
27 flush tube
28 discharge duct
29 further discharge port
30, 30.1 to 30.6 disc-shaped filter member
31 pipe section
32 driving wheel
22 driving unit
34a, 34b wall
35 outer circumference
36a, 36b central breakthrough
37a, 37b ring-shaped mounting plate
371a, 371b, 371.1a, 371.1b central section
372a, 372b, 372.1a, 372.1b outer spike connecting section
38a, 38b spike
39 circumferential frame member
391, 391.1, 391.2 connecting plate
40 stiffener
41a, 41b, 41.1a, 41.1b, 41.2a filter frame
A liquid
Ax axis of rotation
α first angle
β second angle
O opening

The invention claimed is:
1. A rotary disc filter device comprising:
a rotor rotatable about an axis of rotation, having a plurality of disc-shaped filter members, each disc-shaped filter member having a frame defining two opposing walls,
wherein the frame is made of sheet metal elements made of stainless steel which are connected with each other by rivets,
wherein the sheet metal elements include first sheet metal elements, each of which is a ring-shaped mounting plate forming an inner circumference of each of the two opposing walls, each of the ring-shaped mounting plates having a central section extending in a radial direction with respect to the axis of rotation,
wherein the sheet metal elements further include second sheet metal elements forming spikes mounted at each of the ring-shaped mounting plates to extend in an outward direction,
wherein the sheet metal elements further include a third sheet metal element forming an outer circumferential frame element connecting outer ends of the spikes,
wherein the disc-shaped filter member further includes stiffeners made of cylindrical rods and extending between the ring-shaped mounting plates facing each other, and
wherein the ring-shaped mounting plate further includes a connecting section extending around an outer circumference of the central section; the outer circumferential frame element includes circumferential frame members, and connecting plates connecting the circumferential frame members; and the spikes extend outwardly from the connecting section toward the connecting plates.

2. The rotary disc filter device of claim 1, wherein the frame defines the two opposing walls extending outwardly from the axis of rotation, at least one of the two opposing walls having a form of a frustum.

3. The rotary disc filter device of claim 2, wherein the frustum is a cone or a pyramid.

4. The rotary disc filter device of claim 3, wherein the pyramid has n sides, n being a value from 6 to 12.

5. The rotary disc filter device of claim 3, wherein the two opposing walls have a form of a bifrustum.

6. The rotary disc filter device of claim 3, wherein a clearance is formed between adjacent walls of two disc-shaped filter members in a radial direction, said clearance increasing with a radial distance from the axis of rotation.

7. The rotary disc filter device of claim 2, wherein the two opposing walls abut at an outer circumference of the disc-shaped filter member.

8. The rotary disc filter device of claim 1, wherein an inner circumference of each of the ring-shaped mounting places is circular and an outer circumference thereof is polygonal.

9. The rotary disc filter device of claim 1, wherein the outer circumferential frame members are connected to form an outer polygonal circumference of the frame.

10. The rotary disc filter device of claim 1, wherein at least one of the ring-shaped mounting plates of the disc-shaped filter member is connected with a further ring-shaped mounting plate of an adjacent disc-shaped filter member.

11. The rotary disc filter device of claim 1, wherein at least one of the ring-shaped mounting plates arranged at an axial end of the rotor is connected with a pipe section arranged coaxially with respect to the axis of rotation.

12. The rotary disc filter device of claim 1, wherein an opening in the frame defined by two spikes, one of the ring-shaped mounting plates and the outer circumferential frame elements is covered by a filter element.

13. The rotary disc filter device of claim 12, wherein the filter element comprises a filter frame having an inner circumference corresponding with the opening, the filter frame holding a filter cloth.

14. The rotary disc filter device of claim 13, wherein the filter frame is made of further sheet metal elements.

15. The rotary disc filter device of claim 14, wherein the further sheet metal elements are connected by welding, rivets or screws.

16. The rotary disc filter device of claim 1, wherein the central section and the connecting section are arranged to form an angle of 160° to 185° therebetween.

* * * * *